United States Patent [19]

Kichury, Jr.

[11] Patent Number: 5,831,620
[45] Date of Patent: Nov. 3, 1998

[54] SYSTEM AND COMPUTER-BASED METHOD FOR CREATING REAL-TIME MIRROR REFLECTIONS

[75] Inventor: John J. Kichury, Jr., Morris Plains, N.J.

[73] Assignee: Silicon Graphics Incorporated, Mountain View, Calif.

[21] Appl. No.: 674,868

[22] Filed: Jul. 2, 1996

[51] Int. Cl.⁶ .................................................. G06T 15/00
[52] U.S. Cl. .......................................... 345/419; 345/425
[58] Field of Search ..................................... 395/119, 120, 395/121, 125, 126, 127, 133, 134, 135; 345/419–421, 425–427, 433–435

[56] References Cited

U.S. PATENT DOCUMENTS 5,266,941  11/1993  Akeley et al. ........................... 345/201
5,526,471  6/1996  Tannenbaum et al. .................. 395/119

OTHER PUBLICATIONS

James D. Foley et al., *Computer Graphics Principles and Practice*, Second Edition, Addision–Wesley Publishing Co., Chapter 15.10, 1990.

George Wolberg, *Digital Image Warping*, IEEE Computer Society Press, Chapter 7.2, 1990.

Jackie Neider et al., *OpenGL Programming Guide*, Addison–Wesley Publishing Co., pp. 287–289.

*Primary Examiner*—Almis R. Jankus
*Attorney, Agent, or Firm*—Sterne, Kessler, Goldstein & Fox P.L.L.C.

[57] ABSTRACT

A system and computer-based method for performing real-time mirror reflection of objects in a scene using a computer graphics system having a stencil buffer. The scene includes a background and a plurality of mirrors, and the stencil buffer comprises bits with initial values. A first level reflection mask is generated in the stencil buffer for the plurality of mirrors in the scene. Using the first level reflection mask, second level mirror reflections are determined, followed by first level mirror reflections, for each mirror in the scene. The first and second level mirror reflections are then drawn. Finally, the un-mirrored portions of the scene are drawn.

26 Claims, 10 Drawing Sheets

```
for i = each mirror
   compute plane equation of mirror [i]                                    602
   compute xform matrix for mirror[i] such that scene will
   be scaled by -1 about the normal of the mirror plane equation
```

```
for i = each mirror
  {
    Clear Stencil mask to zero
    Disable depth and color buffer writes
    Enable cull backfaces Stencil Function = Always pass                                         604
    Stencil Operation = incr,incr,incr,
    Enable Stenciling Draw mirror[i] surface Define clip plane using inverted plane of mirror surface
  }
```

```
for j = each mirror where j<>i
  {
  /* mirror other mirrors too
   stencil =2 where other mirrors reflect in this mirror */
  Push tranformation matrix
  Multiply matrix for mirror[i] to current xform matrix Stencil Func Equal 1  Stencil Op=Keep,Inor,Incr
  Enable Stenciling Enable clip plane Enable cull frontface Disable depth and color writes
  Draw mirror[j] surface
  Disable clip plane Pop transformation matrix
                                                                           606
  Push transformation matrix
  Mult mirror[i] matrix to xform matrix
  Mult mirror[j] matrix to xform matrix Enable cull backface Stencil Func Equal 2, Stencil Op = Keep,Keep,Keep Enable depth and color writes Draw graphics scene

Stencil Func Equal 2, Stencil Op = Keep,Incr,Incr
  Enable clip plane
  Enable cull front face
  Disable color writes

Draw mirror[j] surface

Pop transformation matrix
  }/* end for j=each mirror where j<>i*/
```

SYSTEM AND COMPUTER-BASED METHOD FOR CREATING REAL-TIME MIRROR REFLECTIONS

BACKGROUND OF THE INVENTION

1. Field of the Invention

The field of the invention relates generally to computer graphics, and more particularly, to a system and computer-based method for creating real-time mirror reflections in a computer-generated scene.

2. Related Art

Figure 9:
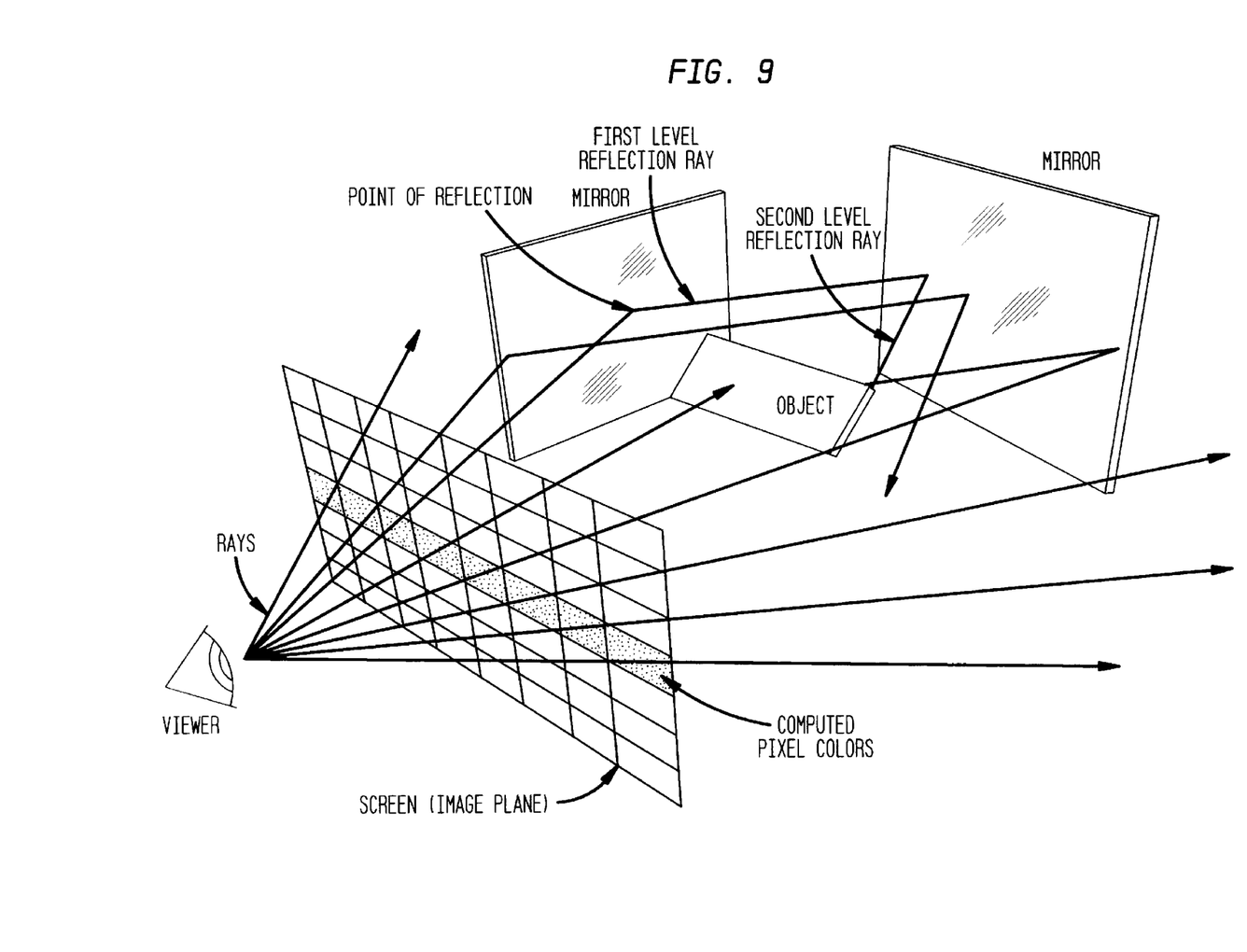
FIG. 9 illustrates a conventional ray-tracing technique for rendering mirror reflections.

Current real-time rendering techniques lack the photorealism to perform mirror reflection that is achieved by non-real-time software solutions, such as ray tracing. Ray tracing determines the visibility of surfaces by tracing imaginary rays of light from the viewer's eye to the objects in the scene. For example, one or more rays are "cast" from the viewer's point of view through each pixel in the resulting image plane. If a ray intersects an object, the color of the object contributes to the pixel color. If the intersected object is reflective (a mirror), a "reflection ray" is cast from the intersection point and further object intersections are computed. If the reflection ray intersects another object, the color of the object contributes to the pixel color. If the intersected object is reflective, another reflection ray is cast and the process is repeated. All of the intersection points are used to derive the pixel color. For an image having the resolution of 1,280×1,024 (a common computer graphics resolution), a minimum of 1,210,720 rays have to be cast and computed. Furthermore, to increase image quality, many rays are typically cast through each pixel thus multiplying the computational burden. This is far too many computations to be made at interactive rates with today's computer technology, and would take 15 to 30 seconds or more to produce a single image for the scene illustrated in FIG. 9 Ray tracing algorithm details and a history of ray tracing are described by James D. Foley and Andries Van Dam, *Fundamentals of Interactive Computer Graphics* Chapter 15.10 (2nd ed. Addison-Wesley Publishing Co. 1990) (1982). Visible-surface ray tracing is computationally intensive. Even current high-end computer graphics systems are not capable of producing real time mirror reflection using ray tracing techniques.

Mirror reflection has also been attempted using environment mapping techniques. A center of projection is chosen from which to map the environment onto the surface of a sphere surrounding the objects to be rendered. The mapped environment can then be treated as a two-dimensional texture map. At each point on an object to be displayed, the reflection map is indexed by polar coordinates of the vector. The goal of environment mapping is to render an object as if it were perfectly reflective, so that the colors on the surface are those reflected to the eye from its surroundings. In other words, if you look at a perfectly polished, perfectly reflective silver object in a room, you see the walls, floor, and other objects in the room reflected off the object. The object whose reflections you see depend on the position of your eye and on the position and surface angles of the silver object. Environment mapping can readily be achieved using texture mapping and functions provided by OpenGL™, for example. See Jackie Neider et al. *OpenGL™ Programming Guide* 287–89 (Addison-Wesley Publishing Company 1993).

Environment mapping for mirror reflections is limited in two significant ways. First, objects within a mapped environment cannot move. Thus, to obtain three-dimensional traversing of an environment-mapped scene would require many separate environment maps. Second, environment mapping does not permit two reflective objects to reflect each other within a rendered scene.

What is desired is a technique to permit real-time mirror reflections permitting multiple reflection bounces.

SUMMARY OF THE INVENTION

The present invention is directed to a system and computer-based method performing real-time mirror reflection of objects in a scene using a computer graphics system having a stencil buffer. The scene includes a background and a plurality of mirrors. The stencil buffer comprises a plurality of bit planes, which are initialized. A first level reflection mask is generated in the stencil buffer for each mirror in the scene. Using the first level reflection mask, second level mirror reflections are determined, followed by first level mirror reflections, for each mirror in the scene. The first and second level mirror reflections are then drawn. Finally, the un-mirrored portions of the scene are drawn.

Setting of the first level reflection mask comprises setting stencil mask bits to a first value where the mirrors exist. In a preferred embodiment, reflection bounces are determined for each mirror in the scene that reflects in another mirror. The stencil mask bits are then set to a second value for the reflection bounces.

Scene objects are geometrically mirrored about planes corresponding to the mirrors, and about a plane corresponding to the mirrors reflection bounces to form a compound transformation. Scene objects are drawn only where the stencil mask equals the second value according to the compound transformation. Stencil mask bits are then set to a given range to achieve a desired level of reflection for each of the reflection bounces.

Further processing is performed for each mirror reflection bounce (i.e., for each mirror that reflects in another mirror). First, before drawing is performed only where the stencil mask equals the first value, scene objects are (1) geometrically mirrored about a plane corresponding to the reflected mirror, and (2) clipped by an inverse of the plane corresponding to the reflected mirror. Second, before drawing is performed only where the stencil mask is not equal to the initial value, scene objects are (1) geometrically mirrored about planes corresponding to each of the mirrors, and (2) clipped by an inverse of the planes corresponding to each of the mirrors.

The drawing of un-transformed scene background is performed only where the stencil mask equals the initial value. The stencil mask is then disabled, and drawing is performed on the remaining un-transformed scene objects.

BRIEF DESCRIPTION OF THE FIGURES

The present invention will be described with reference to the accompanying drawings.

The preferred embodiment of the invention is described below with reference to these figures where like reference numbers indicate identical or functionally similar elements. Also in the figures, the left most digit of each reference number corresponds to the figure in which the reference number is first used.

DETAILED DESCRIPTION OF THE PREFERRED EMBODIMENTS

1. Overview

The present invention is directed to a system and computer-based method for real-time mirror reflection that makes use of stencil buffer and clip plane functions of conventional computer graphics hardware. The present invention permits a computer graphics system to display mirrors that correctly reflect three-dimensional objects within a scene as well as reflections from other mirrors. Thus, the present invention provides multiple reflection bounces. Real time mirror reflection according to the present invention permits a user to traverse a scene while mirrors within the scene properly reflect the objects in the scene, as well as multiple reflection bounces.

Figure 1:
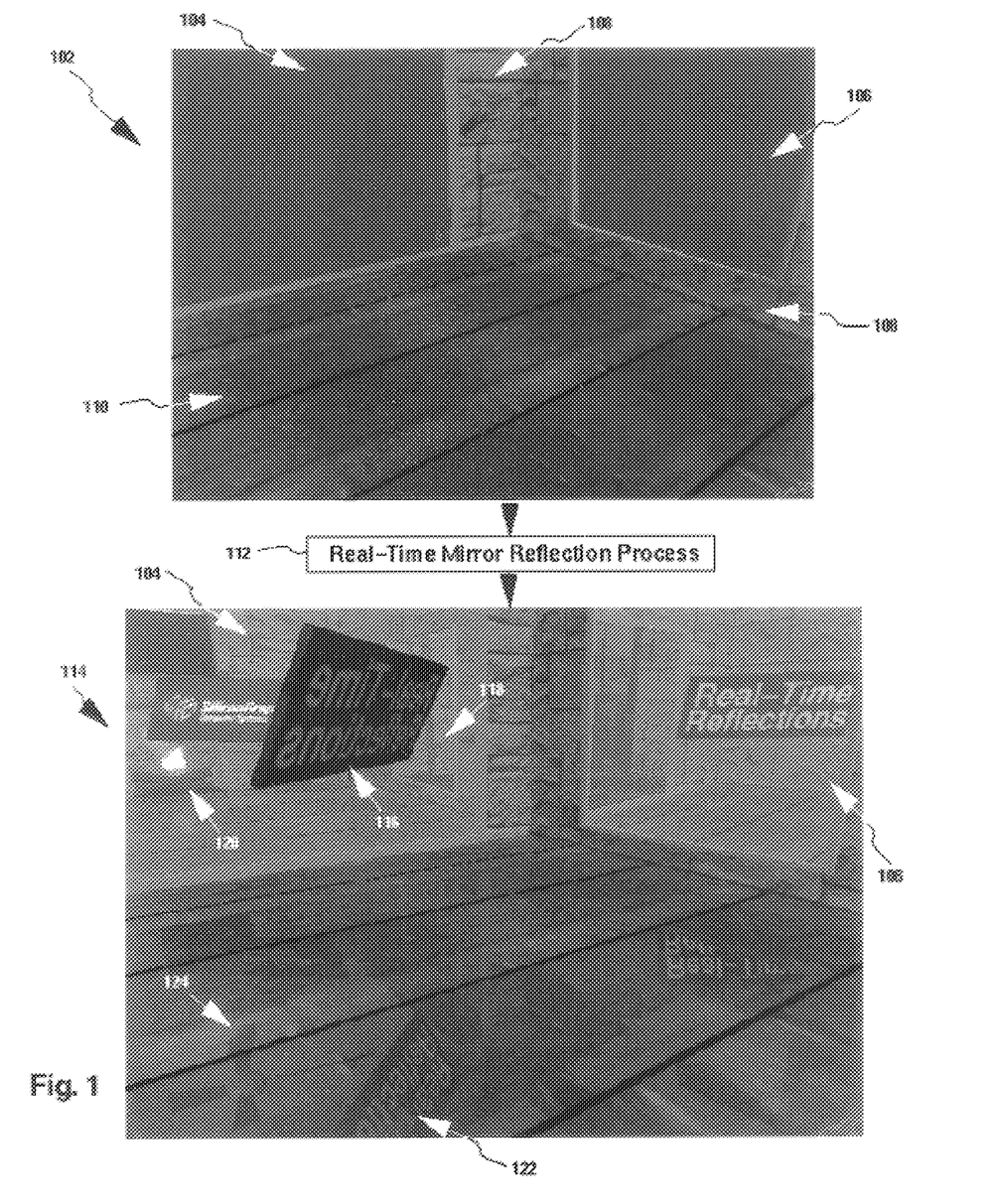
FIG. 1 illustrates a traditional, reflectionless texture mapped scene 102 and a real-time mirror reflection scene 114 processed according to a preferred embodiment of the present invention.

FIG. 1 illustrates a traditional, reflectionless texture mapped scene 102. The scene 102 includes two mirrors 104 and 106, walls 108 and a floor 110. The walls 108 and floor 110 are texture mapped according to conventional texture mapping techniques, such as those described by Foley et al., supra, and George Wolberg, *Digital Image Warping* (IEEE Computer Society Press 1990), as well as the routines supported by OpenGL™. The mirrors 104 and 106 simply appear as untextured windows within the scene 102.

The data representing the geometry shown in FIG. 1 undergoes real-time mirror reflection processing, according to the present invention at 112, to produce a new scene 114 with multiple mirror reflections. The two mirrors 104, 106 and the floor 110 reflect objects within the scene 102, as well as reflection bounces from each other. For example, a two-sided sign 116 is suspended in the center area of the scene. The front of the sign 116 includes an inverse image of the phrase "Real-Time Reflections," which can be read by viewing its reflection in the right mirror 106. The back of the of the sign 116 includes an inverse image of the Silicon Graphics Inc. logo, which can be read by viewing its reflection in the left mirror 104. The left mirror also reflects the right mirror 106, as shown generally at 118, and a fire place reflection 120. The floor 110 reflects the images in mirrors 104 and 106. The floor 110 also includes a sign reflection 122 and a ceiling fan reflection 124.

The mirror reflections shown in new scene 114 are only examples of the type of reflective surfaces that can be created according to the present invention. The following description of the invention will set forth a preferred embodiment to create flat, planar mirror reflections. Modifications of the invention to create mirrored reflections on curved surfaces and the addition of optical distortion to mirrors would be apparent to a person skilled in the art, and are thus within the scope of the present invention.

2. Stencil Buffer and Frame Buffer

A stencil buffer comprises additional bit planes within the frame buffer of a computer graphics system (i.e., a bit in a stencil plane corresponds one-to-one with a pixel of the frame buffer). The collection of bit planes in the stencil buffer is called a stencil mask, and the stencil mask comprises the same number of locations (i.e., pixels) as the frame buffer. Thus, if the stencil buffer comprises 4 bit planes, each stencil mask location has a depth of 4, and can take on up to $2^4$ or 16 distinct values. Associated stencil buffer logic evaluates the data in the stencil mask locations for each corresponding frame buffer location to determine whether data at that frame buffer location can be updated. A stencil buffer is described in detail in U.S. Pat. No. 5,266,941, which issued Nov. 30, 1993, to Akeley et al., titled Apparatus and Method for Controlling Storage of Display Information in a Computer System, and Neider et al., supra. Those skilled in the computer graphics art are familiar with the structure and operation of a frame buffer and a stencil buffer. However, for completeness, a frame buffer is a buffer memory device for a display screen, such as a cathode ray tube (CRT). Data (such as image data, also referred to as graphics data) to be displayed on the display screen are first written to the frame buffer. The data is read from the frame buffer for display on the display screen. A primary use of the stencil buffer is to restrict writing data to certain portions of the frame buffer representing certain portions of the display screen. That is, the stencil buffer allows conditional writing of pixels on a pixel-by-pixel basis.

As noted above, in connection with the present invention the stencil buffer is used to define the geometry of mirrors in the scene and to mask-out un-mirrored scene data from the mirrors. A graphics display system including a stencil buffer and frame buffer is discussed below in connection with FIG. 8 (see Section 6).

3. High Level Description of Real-time Mirror Reflection Processing

Figure 2:
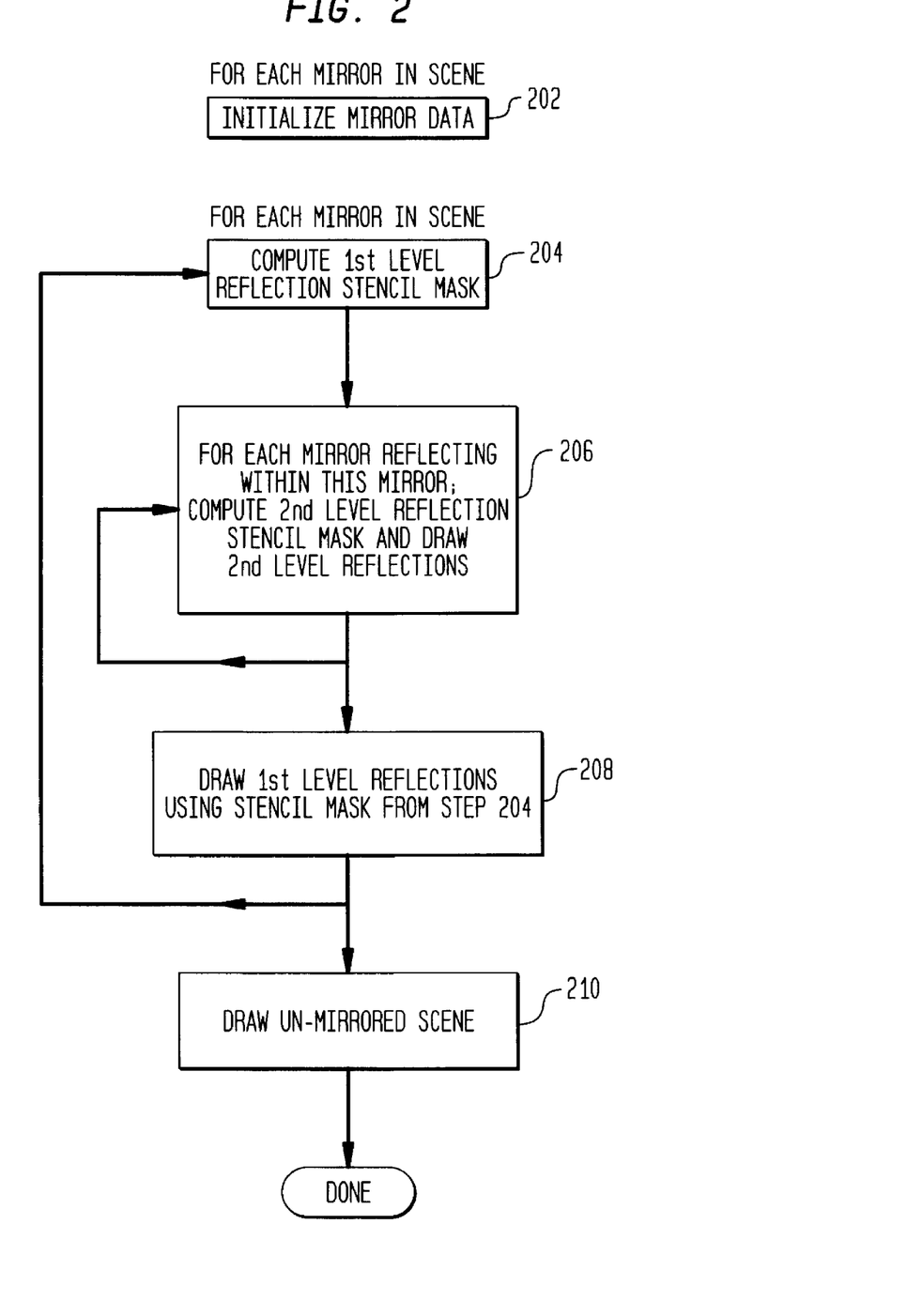
FIG. 2 illustrates a high level flow diagram of real-time mirror reflection processing, according to a preferred embodiment of the present invention.

A high level description of real-time mirror reflection processing 112 will now be described with reference to FIG. 2. Each mirror within a scene to be rendered is initialized at a step 202. Then, for each mirror in the scene, three steps (204, 206 and 208) are performed to render reflections. For example, for a first mirror in the scene, a first level reflection stencil mask is computed at step 204. (Use of a stencil buffer for implementing the present invention will be described below.) For each additional mirror in the scene that reflects within the first mirror, a second level reflection stencil mask is computed and drawn in a frame buffer at step 206. Next at step 208, the first level reflections are drawn in the frame buffer using the stencil mask from step 204. Finally, the un-mirrored scene is drawn to the frame buffer at a step 210.

4. Real-Time Mirror Reflection Processing

Figure 3:
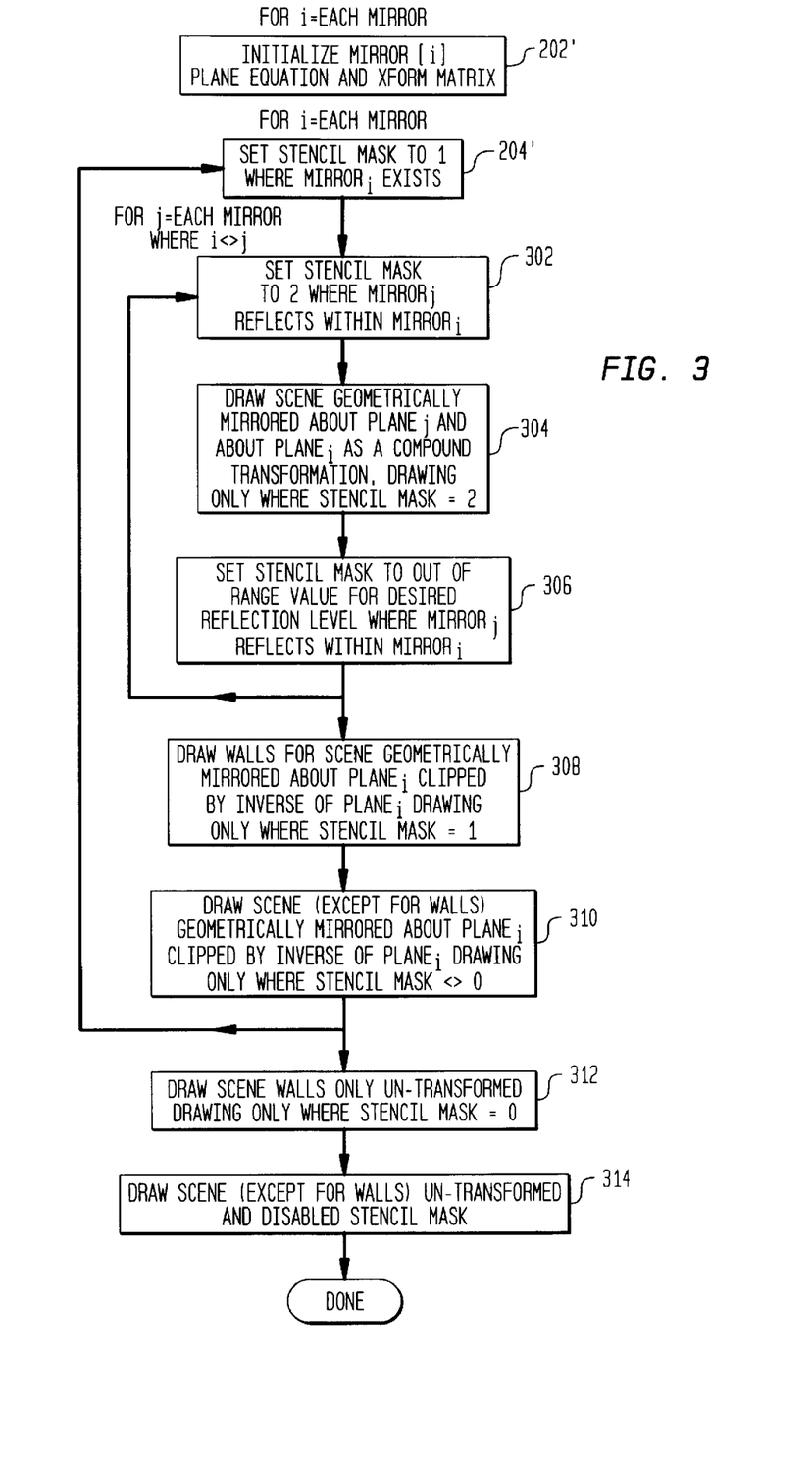
FIG. 3 illustrates a more detailed flow diagram of real-time mirror reflection processing, according to a preferred embodiment of the present invention.

FIG. 3 illustrates a more detailed flow diagram of real-time mirror reflection processing according to a preferred embodiment of the present invention. Initialization step 202' is performed for each mirror, given a total of "I" mirrors. A plane equation, which mathematically represents the geometry of that ith mirror, is computed or otherwise provided to the process. Additionally, a transformation matrix (abbreviated "xform" matrix) is also determined for that ith mirror. The details for determining the plane equation and the mirror's transformation matrix would be apparent to a person skilled in the computer graphics art. The plane equation and transformation matrix of a plane are described in chapters 5.6–5.8 of Foley et al., supra. See also David F.

Rogers, *Mathematical Elements for Computer Graphics* 49–51 (McGraw-Hill 1976).

However, for completeness, a plane equation takes on the algebraic form of: ax+by+cz+d=0, in a Cartesian coordinate system, where x, y and z are the three coordinates, and a, b, c, and d are constants. A 4×4 transformation matrix can be represented as follows:

$$\begin{matrix} a & b & c & d \\ e & f & g & h \\ i & j & k & l \\ m & n & o & p \end{matrix}$$

The diagonal matrix elements a, f and k of the upper-left 3×3 submatrix scale the x, y and z coordinates, respectively. The right matrix elements d, h and l translate the x, y and z coordinates, respectively. Additionally, the bottom matrix elements m, n and o are for projection of the x, y and z coordinates, respectively. The final matrix element p is typically always set equal to 1. For example, simple mirroring of a vector about the x axis is performed by multiplying the vector by an identity matrix with a negative first matrix element. The transformation matrix would thus be:

$$\begin{matrix} -1 & 0 & 0 & 0 \\ 0 & 1 & 0 & 0 \\ 0 & 0 & 1 & 0 \\ 0 & 0 & 0 & 1 \end{matrix}$$

Consider a line segment parallel to the x-y plane, normal to z and located at +2x. Geometric mirroring of this line segment by multiplication of the above transformation matrix would move it to −2x. Geometric mirroring of an object about a plane is performed in a similar manner, as would be apparent to a person skilled in the relevant art. It is also worth noting that conventional computer graphics systems process multiple operations on a single object by multiplication of the transformation matrices representing the multiple operations to form a compound transformation matrix.

Figure 4:
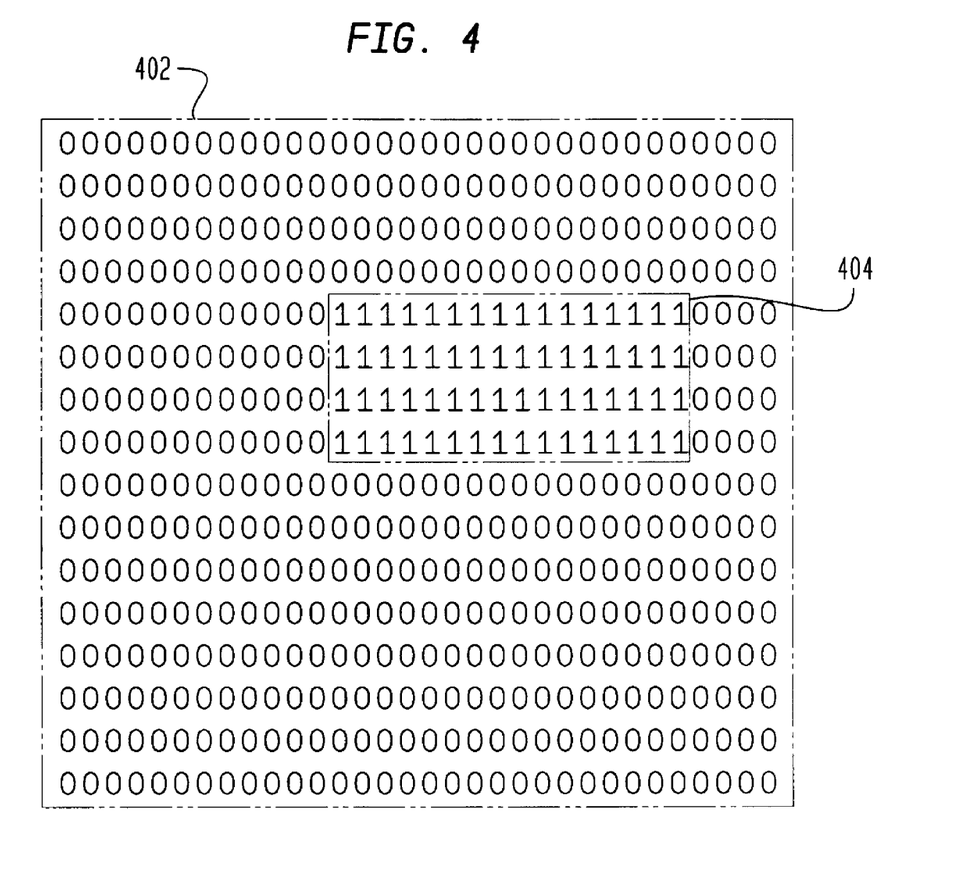
FIG. 4 illustrates a stencil plane 402, according to a preferred embodiment of the present invention.

Turning back to FIG. 2, at a step 204' the stencil mask for the ith mirror is set equal to "1" where ith mirror (mirror$_i$) exists. This step will be referred to generally as "setting the ith level mask". An example diagrammatic representation of a stencil mask 402 is illustrated in FIG. 4. The stencil mask typically comprises plural bit planes, but for illustration only a single example plane is shown (hereafter the ith level). The ith level stencil mask 402 has bits initialized to "0" and others set equal to "1" to represent a rectangular window 404. The window 404 represents a rectangular mirror$_i$, where a first-level reflection will be created in the ith level stencil mask 402. In an actual stencil buffer, each stencil location that corresponds to a pixel in the frame buffer can take on values from $0-2^{n-1}$, where "n" is the number of stencil bit planes. As noted above, the collection of stencil bit planes comprise a single stencil mask.

Second level reflection processing (step 206 of FIG. 2) comprises three distinct steps illustrated at 302, 304 and 306. These three steps are performed for each "jth" mirror (mirror$_j$) that is reflected in mirror$_i$. At step 302 the stencil mask is set to "2" where mirror$_j$ reflects within mirror$_i$. At step 304 the scene is geometrically mirrored about plane$_j$ and about plane$_i$, and is drawn only where the stencil mask values for a pixel is equal to 2. At step 306 the stencil mask is set equal to an "out of range" value for the desired reflection level where mirror$_j$ reflects within mirror$_i$.

The out of range value is a quantity that is greater than the desired number of reflection bounces, and identifies that area of the frame buffer as being complete, and no further reflection processing is to be performed. This is done for mirror$_j$ reflecting within mirror$_i$, and in the event another mirror (i.e., mirror$_{j+1}$) also reflects within mirror$_i$ with the same number of bounces, it prevents conflicts.

Thus, the stencil mask will contain any of the following values:
0=No reflection occurred.
1 through n=Number of reflection bounces (n is the imposed bounce limit).
>n=A number greater than n indicates processing is complete.

The theoretical limit to the number of bounces would be $2^\lambda-1$ (where $\lambda$=number of hardware stencil bits). For example, if a system has 8 stencil planes, and the current algorithm was modified to perform reflection bounces greater than 2, the limit would be $2^8-2=254$. Bounces could be from 1 through 254 with the value of 255 being reserved for the "done" condition.

Figure 5:
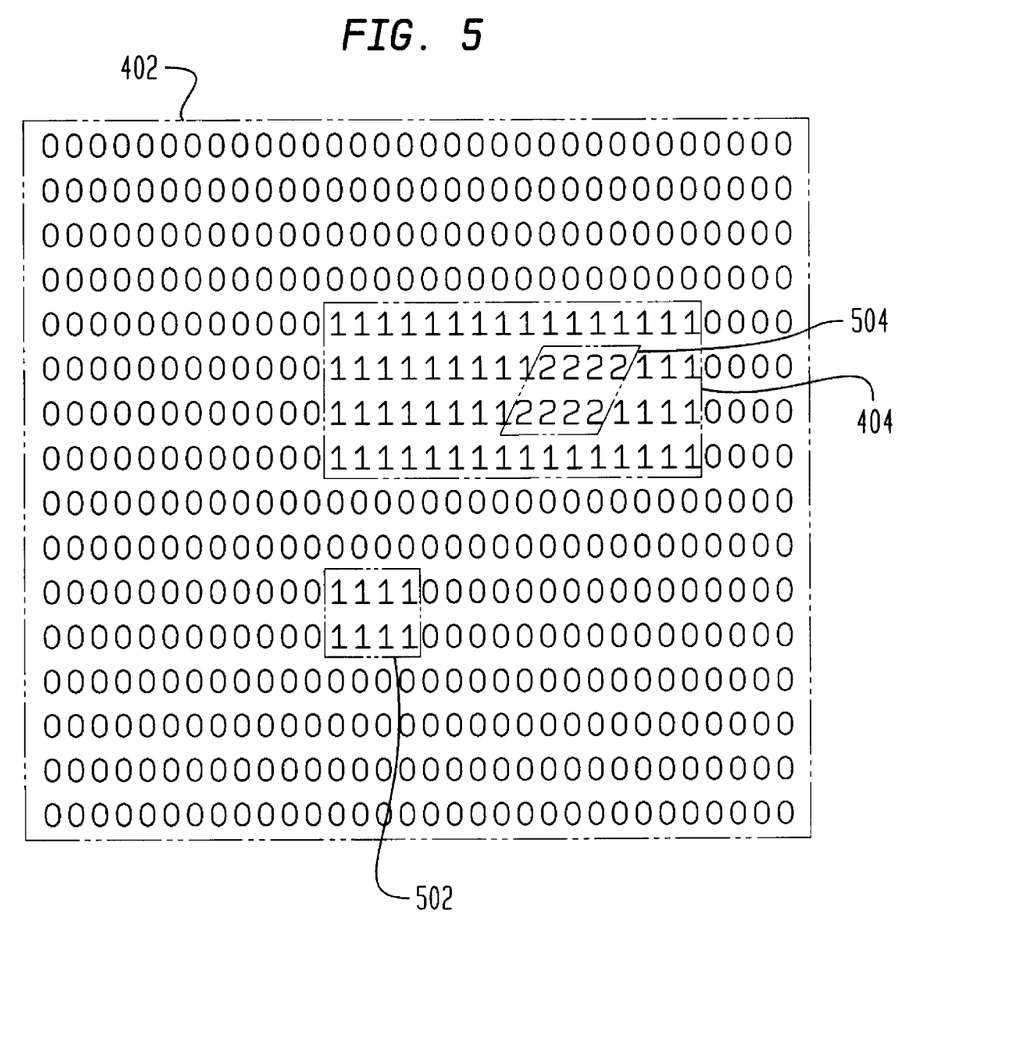
FIG. 5 illustrates stencil plane 402 with a mirror mask 502 and its reflection 504, according to a preferred embodiment of the present invention.

FIG. 5 illustrates the ith level stencil mask 402 with a second window 502 (representing mirror$_j$) set equal to "1". A reflection of mirror$_j$ is illustrated at 504 in mirror$_i$ 404. The reflection 504 is set equal to "2" to indicate that is a second level reflection, also called a reflection bounce. The reflection bounce 504 is illustrated as a different shape as the second planar window 502 (mirror$_j$) to indicate that it is an angular reflection and thus viewpoint dependant.

A more detailed explanation of first level reflection processing (step 208 of FIG. 2) will now be described with reference to two distinct steps illustrated at 308 and 310. These two steps are also performed for each mirror$_j$ that is reflected in mirror$_i$. At step 308 the walls (i.e., background) of the scene are (1) geometrically mirrored about plane$_i$, (2) clipped by the inverse of plane$_i$ and (3) drawn where the stencil mask is equal to "1." At step 310 the scene, except for the walls, is (1) geometrically mirrored about plane$_i$, (2) clipped by the inverse of plane$_i$ and (3) drawn where the stencil mask is a non-zero value (i.e., ≠0).

Clipping by an inverse plane can be understood by way of an example. Consider a page of a book opened flat on a desk and a small mirror erected across the page, facing the bottom of the page and perpendicular to the page. A viewer looking down at the page and the mirror will see the bottom of the page reflected in the mirror, but the mirror will prevent the viewer from seeing the entire top portion of the page. In order for a computer to generate the illusion of the bottom of the page reflected in the mirror, several transformations are necessary. In short, the bottom of the page must be geometrically mirrored (at the proper angles) about a plane located in 3-D space where the reflection is to appear. However, since the bottom of the page is part of the entire page, the entire page is mirrored about that plane. Thus, the top of the page would also be geometrically mirrored. The top of the page would appear as an artifact in front of the mirror, as if hovering above the bottom of the page. The top of the page behind the mirror must therefore be clipped so that objects that are to appear in the mirror are not obscured. This technique is called clipping by the inverse of a plane.

The drawing of the un-mirrored scene (step 210) comprises two distinct steps illustrated at 312 and 314. At step 312 the scene walls are drawn un-transformed, and only where the stencil mask is equal to "0." Finally, at step 314 the remainder of the scene is drawn with the stencil mask disabled.

Figure 6A:
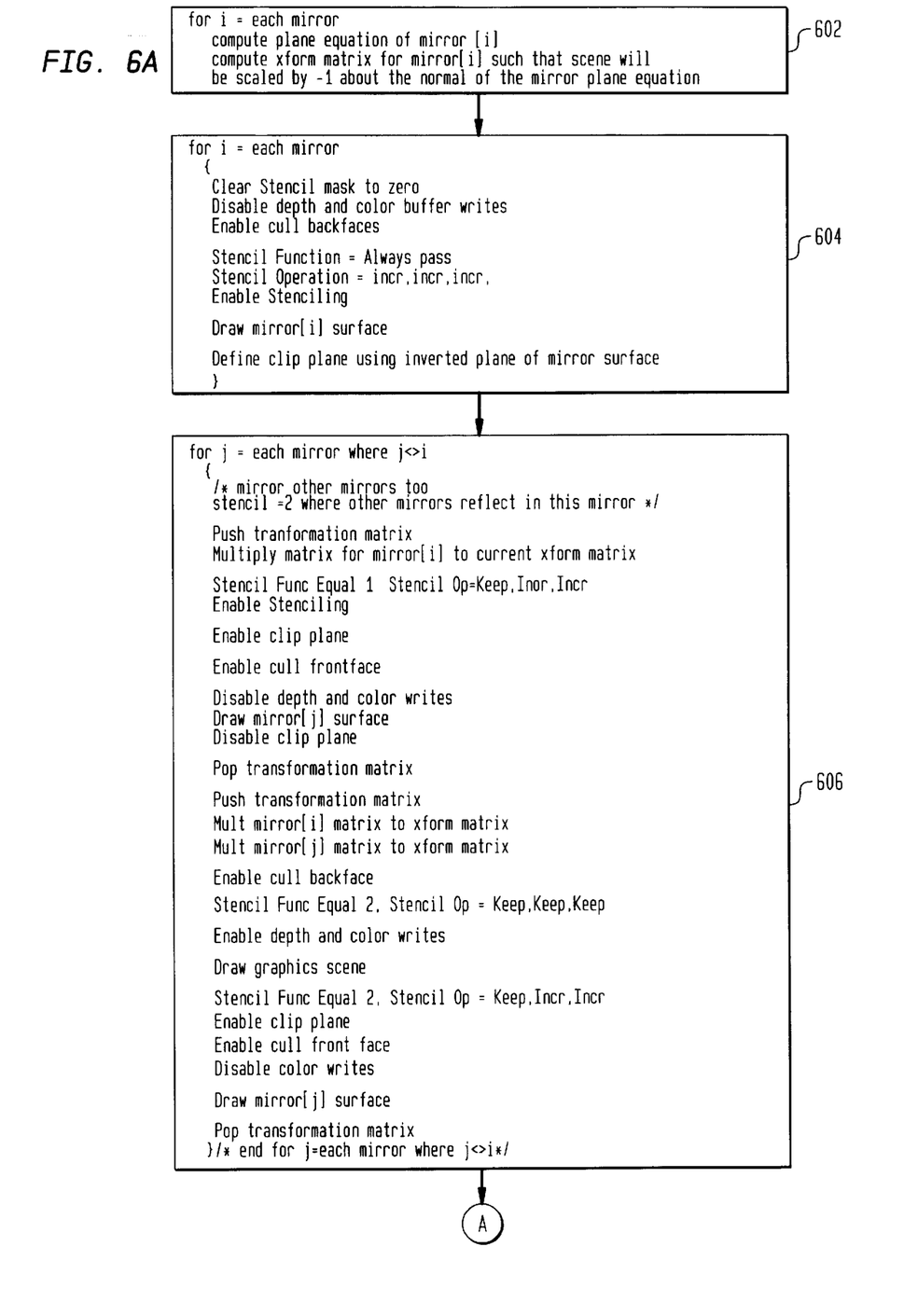
FIGS. 6A and 6B illustrate exemplary pseudo code for the processing described in connection with FIG. 3.
Figure 6B:
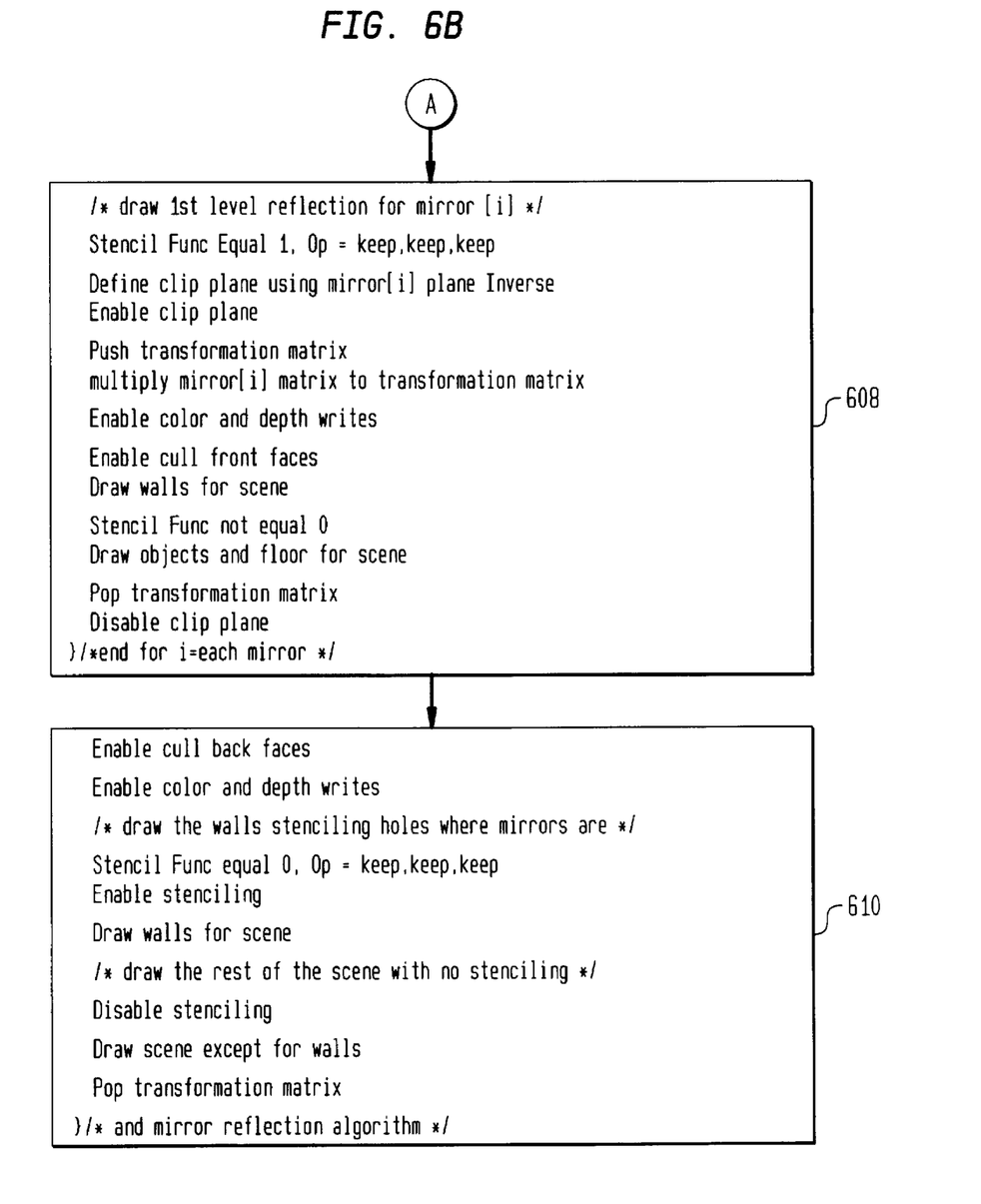

Exemplary pseudo code for the processing described above in connection with FIG. 3 is illustrated in FIGS. 6A and 6B. The code at blocks 602 and 604 correspond to steps 202' and 204', respectively. The code at block 606 corresponds to steps 302, 304 and 306. The code at block 608 corresponds to steps 308 and 310. And finally, the code at block 610 corresponds to steps 312 and 314.

The above example includes reference to zero ("0"), "1" and "2" for stencil mask bit values. However, these values are not intended to limit the present invention and can take on any integer values within the limits of the frame buffer stencil implementation, as would be apparent to a person skilled in the art.

5. Computer Program Product

Figure 7:
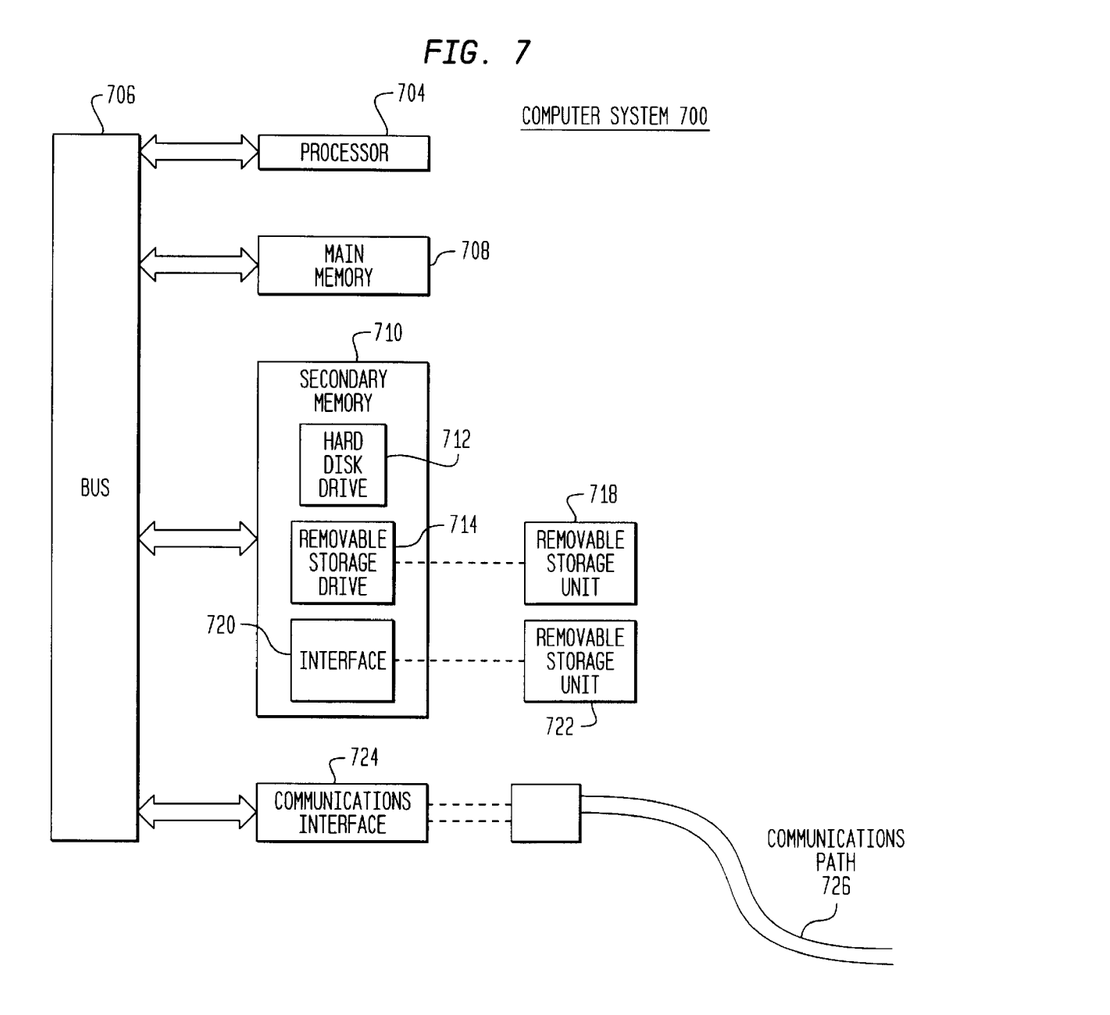
FIG. 7 illustrates an exemplary computer system to implement the present invention.

An exemplary computer environment for implementing the invention is shown in FIG. 7. The environment is a computer system 700 that includes one or more processors (CPU), such as processor 704. The processor 704 is connected to a communications bus 706. Various software embodiments are described in terms of this example computer system. After reading this description, it will be apparent to a person skilled in the relevant art how to implement the invention using other computer systems and/or computer architectures.

Computer system 700 also includes a main memory 708, preferably random access memory (RAM), and can also include a secondary memory 710. The secondary memory 710 can include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718 represents a floppy disk, magnetic tape, optical disk, etc., which is read by and written to by removable storage drive 714. As will be appreciated, the removable storage unit 718 includes a computer usable storage medium having stored therein computer software and/or data.

In alternative embodiments, secondary memory 710 may include other similar means for allowing computer programs or other instructions to be loaded into computer system 700. Such means can include, for example, a removable storage unit 722 and an interface 720. Examples can include a program cartridge and cartridge interface, a removable memory chip (such as an EPROM, PROM, or PCMCIA memory chip) and associated socket, and other removable storage units 722 and interfaces 720 which allow software and data to be transferred from the removable storage unit 722 to computer system 700. Any of the aforementioned memory devices can be used to implement a database.

Computer system 700 can also include a communications interface 724. Communications interface 724 allows software and data to be transferred between computer system 700 and external devices via communications path 726. Examples of communications interface 724 can include modem, printer, a communications port, etc. Software and data transferred via communications interface 724 are in the form of signals that can be electronic, electromagnetic, optical or other signals capable of being received by communications interface 724 via communications path 726. Note that communications interface 724 provides a means by which computer system 700 can interface to a network such as a LAN.

The present invention is preferably implemented using software running (that is, executing) in an environment similar to that described above with respect to FIG. 7. Thus, the term "computer program product" is used to generally refer to a program stored at removable storage device 718 or a hard disk installed in hard disk drive 742. These computer program products are means for providing software to computer system 700.

Computer programs (also called computer control logic) are stored in main memory and/or secondary memory 740. Computer programs can also be received via communications interface 724. Such computer programs, when executed, enable the computer system 700 to perform the features of the present invention as discussed herein. In particular, the computer programs, when executed, enable the processor 704 to perform the features of the present invention. Accordingly, such computer programs represent controllers of the computer system 700.

In an embodiment where the invention is implemented using software, the software may be stored in a computer program product and loaded into computer system 700 using removable storage drive 714, hard drive 742 or communications interface 724. Alternatively, the computer program product may be downloaded to computer system 700 over communications path 726. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of a hardware state machine so as to perform the functions described herein will be apparent to persons skilled in the relevant art(s).

6. Graphics Display System

Figure 8:
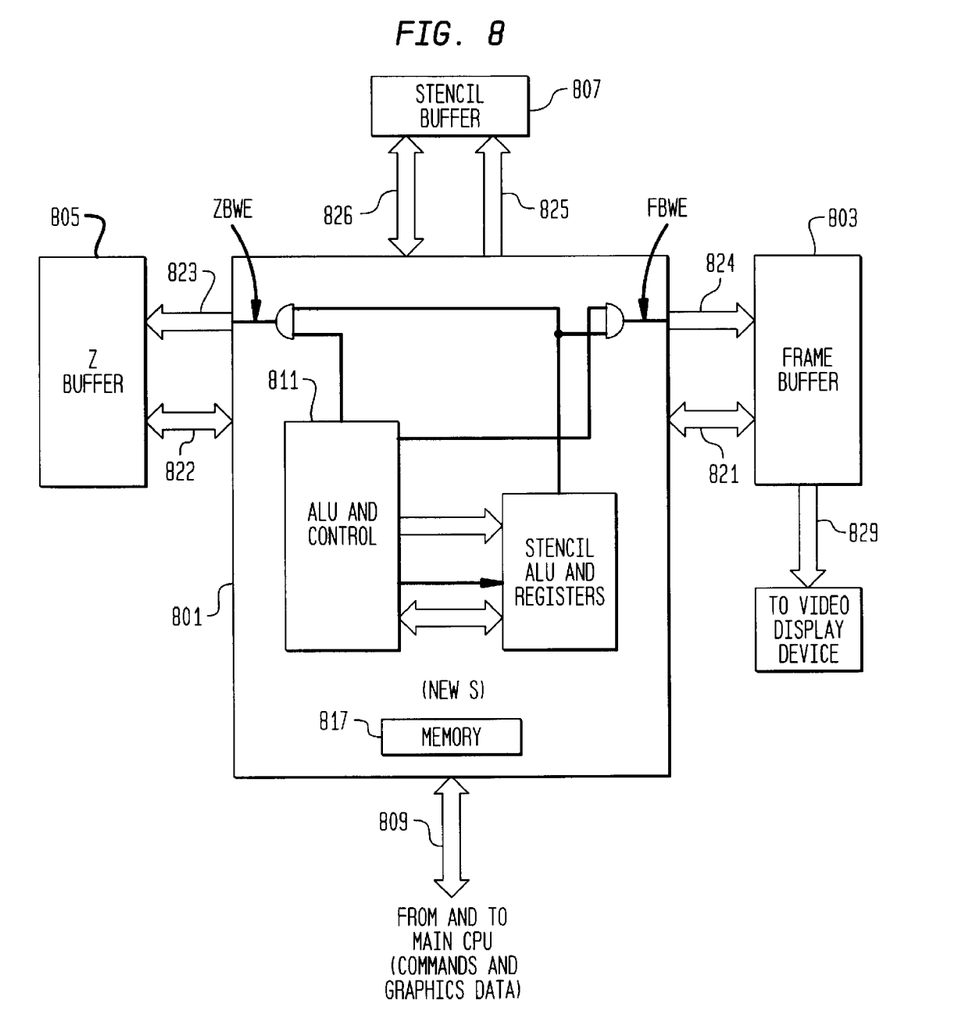
FIG. 8 illustrates an exemplary graphics display system, according to a preferred embodiment of the present invention.

An exemplary graphics display system including a stencil buffer and frame buffer for implementing the present invention is illustrated in FIG. 8. A graphics update controller 801 is coupled to receive commands and graphics data from a main central processor unit (CPU; not shown) or host system via a bus 809. Commands and graphics data are then used by an ALU and control unit 811 to update a Z (depth) buffer 805 in a conventional manner and similarly to update a frame buffer 803 in a conventional manner, according to a hidden surface algorithm. The details of the operation of a graphics update controller are well known; for example, see U.S. Pat. No. 4,951,232, which describes the operation and structure of a graphics update controller similar to the graphics update controller 801.

The graphics update controller 801 is coupled to the frame buffer 803 via a data bus 821 and an address and control bus 824. The graphics update controller 801 is coupled to the Z buffer 805 via a data bus 822 and via address and control bus 823. As can be seen from FIG. 8, the data buses 821 and 822 are bidirectional. The frame buffer 803 is coupled to the video display device (through conventional digital to analog and other controlling circuitry) via bus 829.

A stencil buffer 807 is coupled to the graphics update controller 801 via a data bus 826 and an address and control bus 825; the stencil buffer 807 represents an additional memory buffer, which is similar to the Z buffer and which is updated and refreshed using conventional memory control circuitry by the ALU and control unit 811. It should be noted that while the stencil buffer is shown separate from the Z buffer, it could be a separately addressable part of the Z buffer, thereby allowing simultaneous reading of the old Z value and the old stencil value for a particular memory location corresponding to the currently processed pixel location. As with prior art graphics update controllers, the graphics update controller 801 uses conventional, well known memory refresh and video refresh techniques to refresh the Z buffer and the frame buffer (if they are dynamic random access devices) and to refresh the video display device respectively.

As shown in FIG. 8, the frame buffer 803 is implemented using memory devices which have dual ports in order to permit writing of data into one port and to read out data (display information) to the video display device through another port. The memory 817 provides a scratch pad memory to receive values and hold them for the ALU and control unit 811 and may also contain program storage for operating the ALU and control unit 811. Thus, for example the commands and graphics data from the CPU may be temporarily stored in memory 817 while the ALU in control unit 811 is busy executing other operations. Further details of the graphics display system and update controller 801 may be found in the '266 patent cited above and U.S. Pat. No. 4,951,232. Using such technology hardware, the present invention can generate 15–20 images per second for the scene of FIG. 1, which is fast enough to allow the viewer to interactively move around in the scene. This is not possible using conventional ray-tracing techniques.

7. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents. All cited patent documents and publications in the above description are incorporated herein by reference.

What is claimed is:

1. A method for real-time mirror reflection of objects in a scene using a computer graphics system having a stencil buffer, wherein the scene includes a background and a plurality of mirrors, comprising the steps of:

initializing a plurality of bit planes that comprise the stencil buffer;

generating a first level reflection mask in the stencil buffer for each mirror in the scene;

using said first level reflection mask, determining second level mirror reflections, followed by first level mirror reflections, for each mirror in the scene;

drawing said first and second level mirror reflections; and drawing un-mirrored portions of the scene.

2. The method of claim 1, further comprising the step of setting stencil mask bits to a first value where the mirrors exist.

3. The method of claim 2, further comprising the steps of:

determining reflection bounces for each mirror in the scene that reflects in another mirror; and setting the stencil mask bits to a second value where said reflection bounces occur.

4. The method of claim 3, further comprising the steps of:

geometrically mirroring the scene objects about planes corresponding to the mirrors; and geometrically mirroring the scene objects about planes corresponding to said reflection bounces to form a compound transformation.

5. The method of claim 4, further comprising the step of drawing the scene objects only where the stencil mask equals said second value according to said compound transformation.

6. The method of claim 5, further comprising the step of setting the stencil mask bits to achieve a desired level of reflection for each of said reflection bounces.

7. The method of claim 5, wherein for each of said mirror reflection bounces and before drawing is performed only where the stencil mask equals the first value, the method further comprising the steps of:

(a) geometrically mirroring the scene objects about said planes corresponding to said reflected bounces; and (b) clipping the scene objects by an inverse of the planes corresponding to said reflection bounces.

8. The method of claim 5, wherein for each of said mirror reflection bounces and before drawing is performed only where the stencil mask is not equal to the initial value, the method further comprising the steps of:

(a) geometrically mirroring the scene objects about said planes corresponding to each of the mirrors, and (b) clipping the scene objects by an inverse of the planes corresponding to each of the mirrors.

9. The method of claim 8, wherein said step of drawing un-mirrored portions of the scene comprises:

drawing un-transformed scene background only where the stencil mask equals the initial value; and disabling the stencil mask and drawing remaining un-transformed scene objects.

10. A method for performing real-time mirror reflection of objects in a scene having a stencil buffer with storage locations, wherein the scene includes a background and at least a first mirror reflected in at least a second mirror, comprising the steps of:

(a) initializing locations of a stencil mask to an initial value;

(b) initializing a first surface to represent the first mirror;

(c) initializing a second surface to represent the second mirror;

(d) initializing a first transformation matrix for said first surface;

(e) initializing a second transformation matrix for said second surface;

(f) setting said stencil mask to a first value at locations where said first surface exists;

(g) determining where a reflection of the second mirror projects into said first surface;

(h) setting said stencil mask to a second value at locations corresponding to said reflection;

(i) geometrically mirroring scene objects about said first surface and about said second surface to form a compound transformation;

(j) drawing scene objects only where said stencil mask equal said second value;

(k) setting said stencil mask to a given range to achieve a desired level of reflection for said reflection;

(l) drawing, only where said stencil mask equals said first value, scene background geometrically mirrored about said first surface and clipped by an inverse of said first surface;

(m) drawing, only where said stencil mask is not equal to said initial value, scene objects geometrically mirrored about said first surface and clipped by an inverse of said first surface;

(n) drawing un-transformed scene background only where said stencil mask equals said initial value;

(o) disabling said stencil mask; and (p) drawing un-transformed scene objects.

11. A computer graphics system having a stencil buffer for real-time mirror reflection of objects in a scene, wherein the scene includes a background and a plurality of mirrors, comprising:

a. initializing means for initializing a plurality of bit planes that comprise the stencil buffer;

b. first processing means for storing a first level reflection mask in the stencil buffer for each mirror in the scene;

c. second processing means for determining, for each mirror in the scene,
   i. second level mirror reflections using said first level reflection mask, followed by
   ii. first level mirror reflections; and d. drawing means for drawing
   i. said first and second level mirror reflections, and
   ii. un-mirrored portions of the scene.

12. The computer graphics system of claim 11, further comprising
   (d) setting means for setting stencil mask bits to a first value where the mirrors exist;
   (e) reflection determining means for determining reflection bounces for each mirror in the scene that reflects in another mirror; and
   (f) third processing means for setting the stencil mask bits to a second value where said reflection bounces occur.

13. The computer graphics system of claim 12, further comprising:
   first mirroring means for geometrically mirroring the scene objects about planes corresponding to the mirrors; and
   second mirroring means for geometrically mirroring the scene objects about planes corresponding to said reflection bounces to form a compound transformation,
   wherein said drawing means draws the scene objects only where the stencil mask equals said second value according to said compound transformation.

14. The computer graphics system of claim 13, further comprising further processing means for setting the stencil mask bits to achieve a desired level of reflection for each of said reflection bounces.

15. The computer graphics system of claim 13, further comprising:
   third mirroring means for geometrically mirroring the scene objects about said planes corresponding to said reflected bounces for each of said mirror reflection bounces and before drawing is performed only where the stencil mask equals the first value; and
   first clipping means for clipping the scene objects by an inverse of the planes corresponding to said reflection bounces.

16. The computer graphics system of claim 13, further comprising:
   fourth mirroring means for geometrically mirroring the scene objects about said planes corresponding to each of the mirrors for each of said mirror reflection bounces and before drawing is performed only where the stencil mask is not equal to the initial value, and
   second clipping means clipping the scene objects by an inverse of the planes corresponding to each of the mirrors.

17. The computer graphics system of claim 16, wherein said drawing means that draws un-mirrored portions of the scene further comprises means for drawing un-transformed scene background only where the stencil mask equals the initial value and disabling the stencil mask and drawing remaining un-transformed scene objects.

18. A computer program product for permitting a computer graphics system having a stencil buffer to perform real-time mirror reflection of objects in a scene, wherein the scene includes a background and a plurality of mirrors, said computer program product comprising:
   a computer usable medium having computer readable program code means embodied in said medium for causing an application program to execute on the computer graphics system, said computer readable program code means comprising:
      a computer readable first program code means for causing the computer graphics system to initialize a plurality of bit planes that comprise the stencil buffer;
      a computer readable second program code means for causing the computer graphics system to store a first level reflection mask in the stencil buffer for each mirror in the scene;
      a computer readable third program code means for causing the computer graphics system to determine, for each mirror in the scene, second level mirror reflections using said first level reflection mask, followed by first level mirror reflections; and
      a computer readable fourth program code means for causing the computer system to draw said first and second level mirror reflections, and to draw un-mirrored portions of the scene.

19. The computer program product of claim 18, wherein said computer readable program code means further comprises:
   a computer readable fourth program code means for causing the computer system to setting stencil mask bits to a first value where the mirrors exist.

20. The computer program product of claim 19, wherein said computer readable program code means further comprises:
   a computer readable fifth program code means for causing the computer system to determine reflection bounces for each mirror in the scene that reflects in another mirror; and
   a computer readable sixth program code means for causing the computer system to set the stencil mask bits to a second value where said reflection bounces occur.

21. The computer program product of claim 20, wherein said computer readable program code means further comprises:
   a computer readable seventh program code means for causing the computer system to geometrically mirror the scene objects about planes corresponding to the mirrors; and
   a computer readable eighth program code means for causing the computer system to geometrically mirror the scene objects about planes corresponding to said reflection bounces to form a compound transformation.

22. The computer program product of claim 21, wherein said computer readable third program code means draws the scene objects only where the stencil mask equals said second value according to said compound transformation.

23. The computer program product of claim 22, wherein said computer readable program code means further comprises:
   a computer readable ninth program code means for causing the computer system to set the stencil mask bits to achieve a desired level of reflection for each of said reflection bounces.

24. The computer program product of claim 22, wherein said computer readable program code means further comprises:
   a computer readable tenth program code means for causing the computer system to geometrically mirror the scene objects about said planes corresponding to said reflected bounces for each of said mirror reflection bounces and before drawing is performed only where the stencil mask equals the first value; and a computer readable eleventh program code means for causing the computer system to clip the scene objects by an inverse of the planes corresponding to said reflection bounces.

25. The computer program product of claim 22, wherein said computer readable program code means further comprises:

a computer readable twelfth program code means for causing the computer system to geometrically mirror the scene objects about said planes corresponding to each of the mirrors for each of said mirror reflection bounces and before drawing is performed only where the stencil mask is not equal to the initial value; and a computer readable thirteenth program code means for causing the computer system to clip the scene objects by an inverse of the planes corresponding to each of the mirrors.

26. The computer program product of claim 25, wherein said computer readable third program code means that draws un-mirrored portions of the scene further comprises sixteenth computer readable program code means for causing the computer system to draw un-transformed scene background only where the stencil mask equals the initial value and disabling the stencil mask and drawing remaining un-transformed scene objects.

* * * * *